United States Patent
Das

(10) Patent No.: US 11,443,020 B2
(45) Date of Patent: Sep. 13, 2022

(54) METHOD AND SYSTEM FOR ALLEVIATING AUTHENTICITY OF SENSORS IN BIOMETRIC AUTHENTICATION

(71) Applicant: Wipro Limited, Bangalore (IN)

(72) Inventor: Rishav Das, Howrah (IN)

(73) Assignee: Wipro Limited, Bangalore (IN)

( * ) Notice: Subject to any disclaimer, the term of this patent is extended or adjusted under 35 U.S.C. 154(b) by 392 days.

(21) Appl. No.: 16/797,028

(22) Filed: Feb. 21, 2020

(65) Prior Publication Data
US 2021/0200844 A1    Jul. 1, 2021

(30) Foreign Application Priority Data

Dec. 31, 2019    (IN) .............................. 201941054686

(51) Int. Cl.
| | |
|---|---|
| *G06F 21/32* | (2013.01) |
| *G06N 20/00* | (2019.01) |
| *G06K 9/62* | (2022.01) |
| *G06V 10/98* | (2022.01) |
| *G06V 40/12* | (2022.01) |

(52) U.S. Cl.
CPC ........... *G06F 21/32* (2013.01); *G06K 9/6217* (2013.01); *G06N 20/00* (2019.01); *G06V 10/98* (2022.01); *G06V 40/12* (2022.01)

(58) Field of Classification Search
CPC .... G06F 21/32; G06K 9/6217; G06K 9/6271; G06N 20/00; G06N 3/0445; G06N 3/0454; G06N 3/08; G06V 10/98; G06V 40/12; G06V 10/82; G06V 40/1347
See application file for complete search history.

(56) References Cited

U.S. PATENT DOCUMENTS

| | | | |
|---|---|---|---|
| 6,658,164 B1 | 12/2003 | Irving et al. | |
| 7,706,581 B2 | 4/2010 | Drews et al. | |
| 2010/0153470 A1* | 6/2010 | Angell ................. | G06K 9/6218 707/E17.001 |
| 2013/0259330 A1* | 10/2013 | Russo .................... | G06V 40/13 382/115 |
| 2016/0132669 A1* | 5/2016 | Pathan .................... | G06F 21/32 726/19 |
| 2018/0349586 A1 | 12/2018 | Nowak | |

FOREIGN PATENT DOCUMENTS

CN            106936586 A        7/2017

* cited by examiner

*Primary Examiner* — Abhishek Sarma
(74) *Attorney, Agent, or Firm* — Finnegan, Henderson, Farabow, Garrett & Dunner, LLP

(57) ABSTRACT

A method and authentication system for alleviating authenticity of sensors in biometric authentication is disclosed. The authentication system receives fingerprint data from a plurality of sensing devices configured in the authentication system and extract one or more attributes associated with the fingerprint data. An expanded value for each of the one or more attributes is determined based on one or more predefined techniques. The authentication system (101) trains a model associated with authentication of fingerprints using the one or more attributes and corresponding expanded value. Further, one or more errors associated with the fingerprint data are predicted based on fingerprint data received over a period of time in real-time and the model is retrained based on the predicted one or more errors to alleviate authenticity of sensors in biometric authentication.

18 Claims, 5 Drawing Sheets

METHOD AND SYSTEM FOR ALLEVIATING AUTHENTICITY OF SENSORS IN BIOMETRIC AUTHENTICATION

TECHNICAL FIELD

The present subject matter is related in general to authentication systems, more particularly, but not exclusively to method and system for alleviating authenticity of sensors in biometric authentication.

BACKGROUND

Biometric data, such as fingerprints are used for identification and/or identity verification in security systems. For example, in a fingerprint application, a scanned fingerprint is compared against registered fingerprint references to verify an identity of a user. Fingerprint sensing and matching is a reliable and widely used technique for personal identification or verification. In particular, a common approach to fingerprint identification involves scanning a sample fingerprint or an image thereof and storing the image and/or unique characteristics of the fingerprint image. However, in any biometric based user dependent digital authentication system, accurately extracting user biometric (fingerprint based) details before providing an access determines level of security level and safety against it. For example, starting from smartphone until E-digital locker and other digitally enabled services, fingerprint biometric acts as one level of security to identify users uniquely. This typically involves different methods of detecting the fingerprints such as, using various types of hardware sensors like, ultrasonic sensors, optical sensors, capacitive sensors, thermal sensor and associated software models.

However, existing systems/methods have multiple drawbacks and possesses challenges in identifying type of sensors connected and accurately detecting the fingerprints using different types of hardware sensors. Generally, main reasons for poor fingerprint detection is due to nature of hardware sensors, varying shapes and sizes of human fingers, figure moisture while accessing fingerprint device, hardware sensor bugs, touch ability on sensor surface, operating environment conditions and the like. Use of alternative fingerprint hardware sensors with a common acquisition system requires normalizing certain parameters. This is due to errors resulting from above mentioned circumstances to accurately detect the fingerprint biometrics, irrespective of sensor type used for the acquisition. Further, there exists errors and problems that need to be addressed while detecting the biometric fingerprints. Firstly, because of false identification due to poor sensor interface. Currently, most of the fingerprint detection sensor devices use optical diodes as sensors to capture high-resolution optical photographs of the fingerprint. In such scenario, optical diode light reflection caused by the finger pours represent biometric patterns, which are matched with stored patterns to authenticate the user. However, in such scenarios, the system can be easily fooled by similar user images obtained through fraud. Also, such systems may not measure external factor or is unable to sense relative pattern while capturing user biometrics. Hence, usage has been limited due to breaching problem in this type of chipset.

Secondly, errors may occur due to influence of external environment factors such as, temperature. The evolution of fingerprint detection scanner (for example, Captive finger print detection scanner) has recovered flaws which was depleted in the optical scanner. The usage of captive scanner for capturing biometric added benefit in understanding the external factor of the fingerprint. The external environmental factors like temperature etc. are used in order to determine real time use of the fingerprint sensor for capturing the fingerprint for authentication. However, there exist some challenges in determining the effect of external factors while capturing the fingerprints in real-time. Such as, improper temperature ratio, which is experienced while capturing, wet hand fingerprint. This situation is very finicky and often required several attempts to scan and match result correctly. In order to determine the same, the sensor need to be calibrated to detect the temperature changes and also to compensate the error caused by temperature variation. Thus, it requires a sensor intelligence in order to interpret the environmental temperature and real-time finger temperature.

The information disclosed in this background of the disclosure section is only for enhancement of understanding of the general background of the invention and should not be taken as an acknowledgement or any form of suggestion that this information forms the prior art already known to a person skilled in the art.

SUMMARY

In an embodiment, the present disclosure may relate to a method for alleviating authenticity of sensors in biometric authentication. The method comprises receiving fingerprint data from a plurality of sensing devices configured in a authentication system and extracting one or more attributes associated with the fingerprint data. An expanded value for each of the one or more attributes is determined based on one or more predefined techniques. Further, a model associated with authentication of fingerprints is trained using the one or more attributes and corresponding expanded value and one or more errors associated with the fingerprint data are predicted based on fingerprint data received over a period of time in real-time. Thereafter, retraining of the model is performed based on the predicted one or more errors to alleviate authenticity of sensors in biometric authentication.

In an embodiment, the present disclosure may relate to an authentication system for alleviating authenticity of sensors in biometric authentication. The authentication system may comprise a processor and a memory communicatively coupled to the processor, where the memory stores processor executable instructions, which, on execution, may cause the authentication system to receive fingerprint data from a plurality of sensing devices configured in a authentication system and extract one or more attributes associated with the fingerprint data. The authentication system determines an expanded value for each of the one or more attributes based on one or more predefined techniques. Further, a model associated with authentication of fingerprints is trained using the one or more attributes and corresponding expanded value and one or more errors associated with the fingerprint data are predicted based on fingerprint data received over a period of time in real-time. Thereafter, the authentication system performs retraining of the model based on the predicted one or more errors to alleviate authenticity of sensors in biometric authentication.

In an embodiment, the present disclosure relates to a non-transitory computer readable medium including instructions stored thereon that when processed by at least one processor may cause to receive fingerprint data from a plurality of sensing devices configured in an authentication system and extract one or more attributes associated with the fingerprint data. The instruction causes the processor to determine an expanded value for each of the one or more attributes based on one or more predefined techniques. Further, a model associated with authentication of fingerprints is trained using the one or more attributes and corresponding expanded value and one or more errors associated with the fingerprint data are predicted based on fingerprint data received over a period of time in real-time. Thereafter, the instruction causes the processor to perform retraining of the model based on the predicted one or more errors to alleviate authenticity of sensors in biometric authentication.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE ACCOMPANYING DRAWINGS

The accompanying drawings, which are incorporated in and constitute a part of this disclosure, illustrate exemplary embodiments and, together with the description, serve to explain the disclosed principles. In the figures, the left-most digit(s) of a reference number identifies the figure in which the reference number first appears. The same numbers are used throughout the figures to reference like features and components. Some embodiments of system and/or methods in accordance with embodiments of the present subject matter are now described, by way of example only, and with reference to the accompanying figures, in which:

Figure 1:
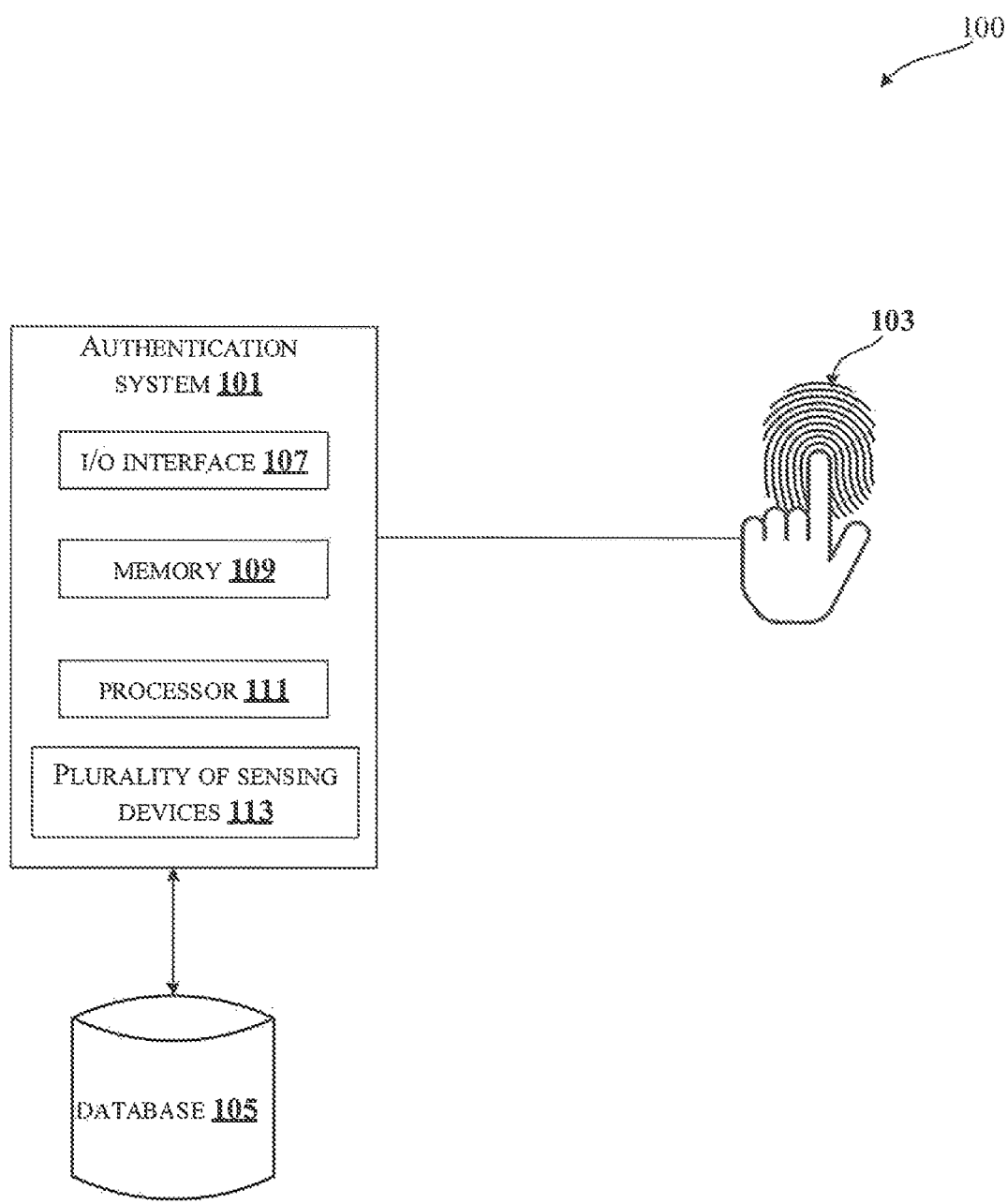
FIG. 1 illustrates an exemplary environment for alleviating authenticity of sensors in biometric authentication in accordance with some embodiments of the present disclosure.

It should be appreciated by those skilled in the art that any block diagrams herein represent conceptual views of illustrative systems embodying the principles of the present subject matter. Similarly, it will be appreciated that any flow charts, flow diagrams, state transition diagrams, pseudo code, and the like represent various processes which may be substantially represented in computer readable medium and executed by a computer or processor, whether or not such computer or processor is explicitly shown.

DETAILED DESCRIPTION

In the present document, the word "exemplary" is used herein to mean "serving as an example, instance, or illustration." Any embodiment or implementation of the present subject matter described herein as "exemplary" is not necessarily to be construed as preferred or advantageous over other embodiments.

While the disclosure is susceptible to various modifications and alternative forms, specific embodiment thereof has been shown by way of example in the drawings and will be described in detail below. It should be understood, however that it is not intended to limit the disclosure to the particular forms disclosed, but on the contrary, the disclosure is to cover all modifications, equivalents, and alternative falling within the spirit and the scope of the disclosure.

The terms "comprises", "comprising", or any other variations thereof, are intended to cover a non-exclusive inclusion, such that a setup, device or method that comprises a list of components or steps does not include only those components or steps but may include other components or steps not expressly listed or inherent to such setup or device or method. In other words, one or more elements in a system or apparatus proceeded by "comprises . . . a" does not, without more constraints, preclude the existence of other elements or additional elements in the system or method.

In the following detailed description of the embodiments of the disclosure, reference is made to the accompanying drawings that form a part hereof, and in which are shown by way of illustration specific embodiments in which the disclosure may be practiced. These embodiments are described in sufficient detail to enable those skilled in the art to practice the disclosure, and it is to be understood that other embodiments may be utilized and that changes may be made without departing from the scope of the present disclosure. The following description is, therefore, not to be taken in a limiting sense.

Embodiments of the present disclosure may relate to a method and authentication system for alleviating authenticity of sensors in biometric authentication. Existing scenarios in fingerprint authentication possess problem of identifying type of sensors connected and accurate detection of fingerprints using different types of hardware sensors. In such systems, one or more errors associated with sensors are not learned or analysed. Thus, such systems become static to error prediction in fingerprint biometrics. The present disclosure resolves this problem by using cognitive technique which reduces dependency on sensor type. The present disclosure determines attributes and expanded value associated with fingerprint data of a user in order to understand type of sensor used. The attributes and the expanded value of the fingerprint data are utilised for training a model associated with authentication of fingerprints. Further, the present disclosure determines one or more errors over a period of time in the fingerprint data which are utilised to retain the model. Particularly, the one or more errors are adjusted against the type of sensor by retraining the model. Thus, the present disclosure provides a robust authentication system and decreases authentication execution time.

FIG. 1 illustrates an exemplary environment for alleviating authenticity of sensors in biometric authentication in accordance with some embodiments of the present disclosure.

As shown in FIG. 1, an environment 100 includes an authentication system 101 for alleviating authenticity of sensors in biometric authentication. The authentication system 101 may receive fingerprint data associated with a user 103. Further, the authentication system 101 may be connected to a database 105. The database 105 may include the fingerprint data collected for different users. In an embodiment, the database 105 may include training data and one or more error data. Further, the authentication system 101 may include an I/O interface 107, a memory 109, a processor 111 and plurality of sensing device 113. The I/O interface 107 may be configured to receive data from the user 103 and the database 105. The data from the I/O interface 107 may be stored in the memory 109. The memory 109 may be communicatively coupled to the processor 111 of the authentication system 101. The memory 109 may also store processor instructions which may cause the processor 111 to execute the instructions for alleviating authenticity of sensors in biometric authentication. In an embodiment, the plurality of sensing device 113 may include varied type of sensors such as, ultrasonic sensors, optical sensors, capacitive sensors, thermal sensor and the like which are used for obtaining image from corresponding sensor plate. The authentication system 101 mitigates the errors induced by the plurality of sensing device 113 to avoid false user identification.

The authentication system 101 may include, but not limited to, a smartphone, a dedicated handheld device, a tablet, bots, robots, a server and any other computing devices. A person skilled in the art would understand that, any other devices, not mentioned explicitly, may also be used as the authentication system 101 in the present disclosure. In an embodiment, the authentication system 101 may exchange data with other components or service provider using a wide area network/Internet (not shown explicitly in FIG. 1). In an embodiment, the authentication system 101 may be implemented on groups of programmable conveyors, mobiles, security systems, surveillance devices and the like. A person skilled in the art would understand that, any other devices, not mentioned explicitly, may also be used for implementing the authentication system 101 of the present disclosure.

Initially during training phase, the authentication system 101 may receive fingerprint data of the user 103 from the plurality of sensing devices 113. Since the fingerprint data may be of varied type, the authentication system 101 extracts one or more attributes associated with the fingerprint data. The one or more attributes may include pixel values, patterns values, pre-defined template values, numerical, integers and the like. In an embodiment, the one or more attributes correspond to a type of the plurality of sensing devices 113 and one or more external environment parameters such as temperature, heat and the like. In an embodiment, the one or more attributes may vary uniquely from user to user. Further, the authentication system 101 may determine an expanded value for each of the one or more attributes. In an embodiment, the expanded value is an extended value of the fingerprint data which may likely match a future fingerprint of the user 103.

The expanded value for each of the one or more attributes are determined based on one or more predefined techniques. In an embodiment, the one or more predefined techniques may be standard deviation, clustering technique and the like. A person skilled in the art would understand that any other technique for expanding the one or more attributes, not mentioned herein explicitly, may also be used in the present disclosure. In an embodiment, the expanded value for the fingerprint data is determined by identifying an upper limit and a lower limit for each of the one or more attributes along with a plurality of distortion angles. On determining the expanded value, the authentication system 101 trains a model associated with authentication of fingerprints using the one or more attributes and corresponding expanded value.

In an embodiment, the model is a machine learning model such as, Convolutional Neural Network (CNN) based model, Long Short-Term Memory (LSTM) based model and the like. The model is explained in detail in subsequent figures. Further, over a period of time, the authentication system 101 predicts one or more errors associated with the fingerprint data. In an embodiment, the one or more errors may be identified by comparing fingerprint data received from the user 103 over the time with actual/first logged fingerprint data of the user 103. Thus, in such case, the authentication system 101 may perform retraining of the model based on the predicted one or more errors in order to alleviate the authenticity of sensors in biometric authentication. For example, consider if accuracy achieved is 93 percentage, with 7 percentage errors. In such case, the authentication system 101 retrains the model based on the predicted errors. Further, recent retrained model may be replaced with previous version of the model.

Figure 2:
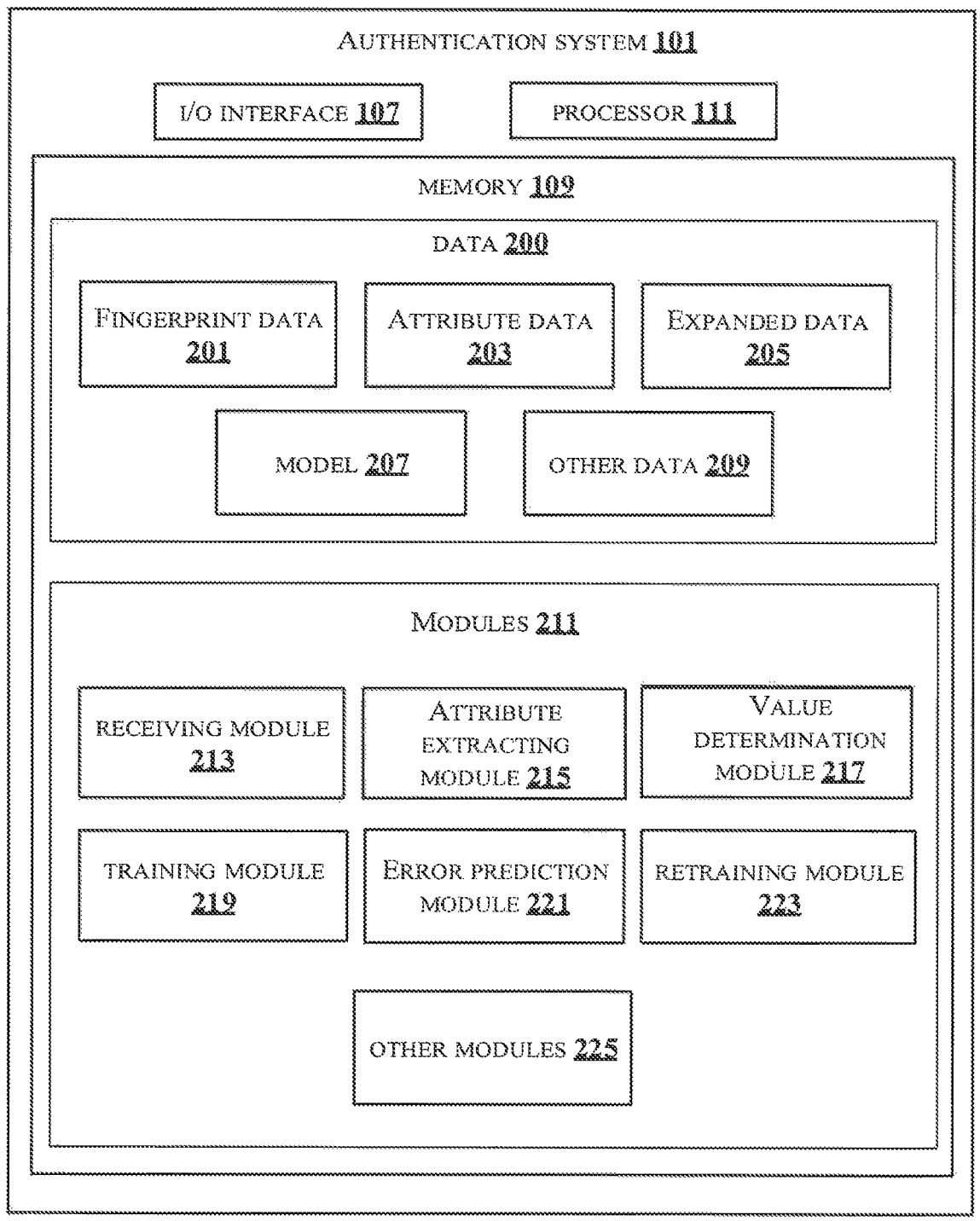
FIG. 2 shows a detailed block diagram of an authentication system in accordance with some embodiments of the present disclosure.

FIG. 2 shows a detailed block diagram of an authentication system in accordance with some embodiments of the present disclosure.

The authentication system 101 may include data 200 and one or more modules 211 that are described herein in detail. In an embodiment, data 200 may be stored within the memory 109. The data 200 may include, for example, fingerprint data 201, attribute data 203, expanded data 205, model 207 and other data 209.

The fingerprint data 201 may include fingerprint dataset associated with users. The fingerprint dataset may be in different format. In an embodiment, the fingerprint data may be in form of image which may be deployed as a set of values or pixel values. In such case, the pixel values may be compared and pixel parameters such as, brightness, color contrast, pixels value, are stored as fingerprint dataset.

The attribute data 203 may include the one or more attributes associated with the fingerprint data. The one or more attributes corresponds to the type of the plurality of sensing devices 113 and the one or more external environment parameters. The one or more attributes may include pixel values such as, brightness, color contrast, patterns values, pre-defined template values, numerical, integers and the like depending on the type of the plurality of sensing devices 113.

The expanded data 205 may include the expanded values determined for each of the one or more attributes associated with the fingerprint data. The expanded values may include the upper limit and the lower limit for the one or more attributes along with the plurality of distortion angles.

The model 207 may include the model associated with the associated with authentication of fingerprints. The model 207 is trained using the fingerprint data. Further, the model may be retrained based on the one or more errors predicted for the fingerprint data.

The other data 209 may store data, including temporary data and temporary files, generated by modules 211 for performing the various functions of the authentication system 101.

In an embodiment, the data 200 in the memory 109 are processed by the one or more modules 211 present within the memory 109 of the authentication system 101. In an embodiment, the one or more modules 211 may be implemented as dedicated units. As used herein, the term module refers to an application specific integrated circuit (ASIC), an electronic circuit, a field-programmable gate arrays (FPGA), Programmable System-on-Chip (PSoC), a combinational logic circuit, and/or other suitable components that provide the described functionality. In some implementations, the one or more modules 211 may be communicatively coupled to the processor 111 for performing one or more functions of the authentication system 101. The said modules 211 when configured with the functionality defined in the present disclosure will result in a novel hardware.

In one implementation, the one or more modules 211 may include, but are not limited to a receiving module 213, an attribute extracting module 215, a value determination module 217, a training module 219, an error prediction module 221 and a retraining module 223. The one or more modules 211 may also include other modules 225 to perform various miscellaneous functionalities of the authentication system 101. In an embodiment, the other modules 225 may include an authentication module for authenticating the fingerprint of the user 103 in real-time.

The receiving module 213 may receive the fingerprint data from the plurality of sensing devices 113. The plurality of sensing devices 113 captures the fingerprint data in different format.

The attribute extracting module 215 may extract the one or more attributes associated with the fingerprint data. The one or more attributes may include the pixel values, patterns values, pre-defined template values, numerical and integers. In an embodiment, the attribute extracting module 215 captures the fingerprint data and creates a pattern using sensor values. Typically, the patterns may vary uniquely from user to user. In an embodiment, attributes such as, the pixel or numerical values may include specific set of features such as, patterns, intensity, complexion, distortions and the like.

The value determination module 217 may determine the expanded value for each of the one or more attributes. The one or more attributes are expanded to determine a deviation from historical dataset or for a new fingerprint dataset. The value determination module 217 may determine the expanded value by using the predefined techniques such as, standard deviation technique. For instance, for pixel dataset, the one or more attributes are brightness, contrast and depth values (2d pixel values) in numerical form. The standard deviation of the numerical value or pixels are generated by using the clustering technique which is within a threshold of the value. For example, if the value is 365 and its average threshold value between 80% to 120% is 292, in such case, calculated average and standard deviation across threshold rate is acceptable. This is determined using an equation of the standard deviation as indicated in equation 1 below.

$$\text{sqrt}[(x-x\text{mean})2/n-1] \quad (1)$$

where, x is the values beyond 292 till 365
$X_{mean}$ is the average.

In an embodiment, a plot of standard deviation may be used to form expanded value and any inflation/deflation percentage of 20% may create more combinations of patterns/values for the fingerprint data. Further, an error distortion of the fingerprint data may be caused by the plurality of sensing devices 113 and may be generated by a predefined degree interval of the angle of values of the distortions.

The training module 219 may train the model associated with the authentication of fingerprints. The model is trained using the machine learning techniques. Typically, the training involves feeding the fingerprint dataset with the one or more attributes and corresponding expanded value to the model. In an embodiment, the model may include neural network model. Initially, the model is trained using the pixel based dataset and processed using CNN based model. Subsequently, the model is fed with the numerical or pattern based values which are derived using LSTM based model. In an embodiment, the CNN based training is performed based on design of the model and may include convert layer, which includes the pixel values. In an embodiment, in order to reduce dimension of these pixels, the pixel values may undergo pooling layers and further to make all the pixels concentrated in training, the fingerprint dataset may undergoes striding. Later, activation function may be used to determine or trigger based on repeated pixel of pervious convert layer as.

Likewise, the LSTM based model may take the numerical values of the fingerprint and determine a relativity of the fingerprint dataset. In an embodiment, the training module 219 may use any neural network such as CNN, LSTM, RNN or a customized neural network. In an embodiment, while using the CNN, pixel values may be in form of matrices, where a slider may be sliding across the matrix and other various technique such as max-pooling, average pooling, receptive filed and other parameters are used in the training of CNN. Typically, the CNN may connect with fully connected layer or softmax layer. Further, the LSTM used for the numerical values may be a three layer neural network, which may at first selects the attributes which needs to be measured. Further, based on previous or past history, weight in the model for the training is adjusted. In an embodiment, initial weight may remain same as total values of the one or more attributes/expanded value. An exemplary architecture and generic design of the CNN is disclosed below.

Numerical Calculation for Convolution Neural Network:
Accepts a volume of size W1×H1×D1, requires four hyper parameters, namely, Number of filters K, their spatial extent F, the stride S and the amount of zero padding P.
Produces a volume of size W2×H2×D2 where:

$$W2=(W1-F+2P)/S+1 \quad (2)$$

$$H2=(H1-F+2P)/S+1 \text{ (i.e. width and height are computed equally by symmetry)} \quad (3)$$

where, D2=K

With parameter sharing, introduces (F·F·D1) weights per filter, for a total of (F·F·D1)·K weights and K biases. In output volume, the d-th depth slice (of size W2×H2) is the result of performing a valid convolution of the d-th filter over the input volume with a stride of S, and then offset by d-th bias. A common setting of the hyper parameters is F=3, S=1,P=1. However, there are common conventions and rules of thumb that motivate these hyper parameters.

Figure 3:
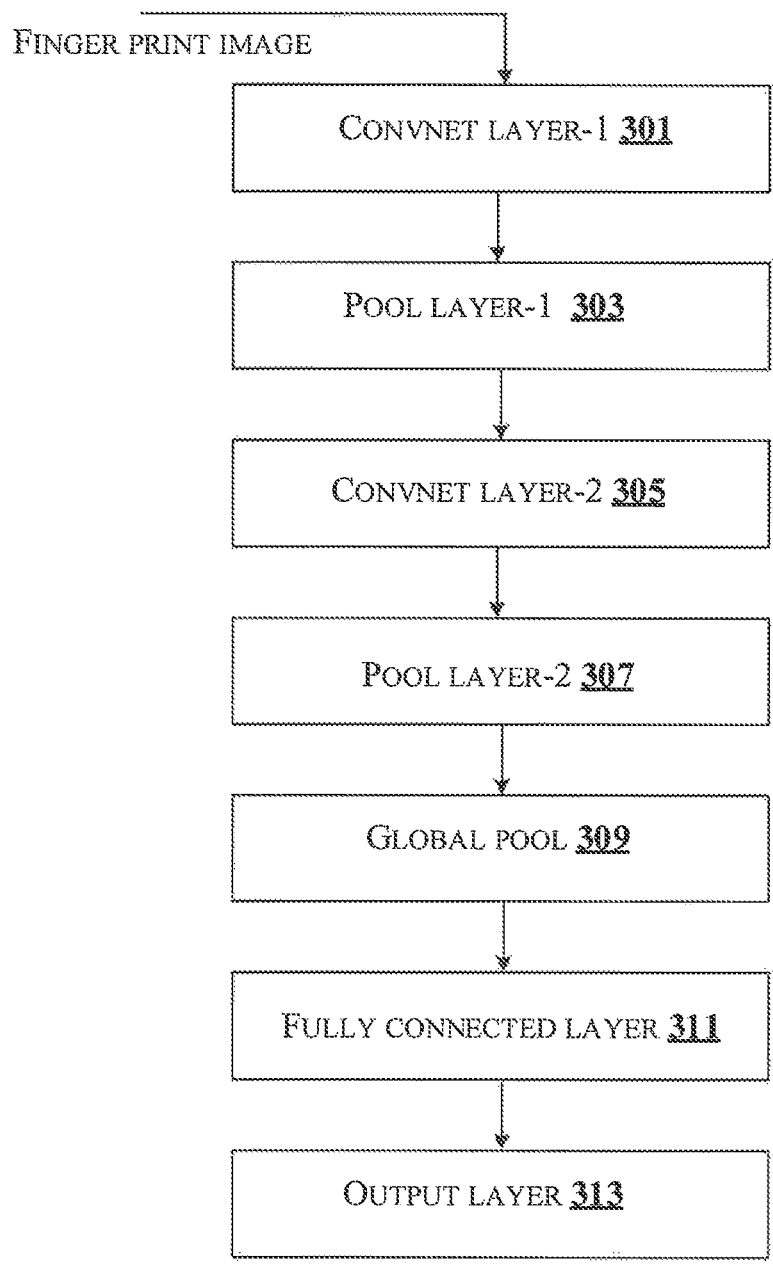
FIG. 3 shows an exemplary flowchart of training the model in accordance with some embodiments of the present disclosure.

FIG. 3 shows an exemplary flowchart of training the model in accordance with some embodiments of the present disclosure. As shown, the model includes the following layers namely, the ConvNet layers (ConvNet layer 1 301, ConvNet layer 2 305), the Pool layers (Pool layer 1 303 and Pool layer 2 307), a Global Pool Layer (GPL) (309) a fully connected layer (311) and an output layer (313). The ConvNet layers (ConvNet layer 1301, ConvNet layer 2 305) consist of matrix which contains the pixels of the image (fingerprint). The pixel values are stored based on the one or more attributes such as, color, density, brightness, contrast and other parameters. The Pool layers (Pool layer 1 303 and Pool layer 2 307) may help in reducing the pixel elaboration or intensity of the fingerprint data referring to image of finger print convoluted matrix. In an embodiment, the Pool layers (Pool layer 1 303 and Pool layer 2 307) may choose a highest intensity pixel and slide over the matrix to reduce amount of pixel and simplify the image pattern. The GPL (309) may be used to merge all dataset into average layer pool after navigating through multiple layer of the convolutional and pooling network. Further, when the average pooling complete, the matrix reduces into values and based on the number of attributes to be examined, the activation function is attached to the fully connected layer (311) to provide outcome to the output layer (313) as part of prediction. In an embodiment, the CNN may be designed in different layers depending upon the application and type of images used as an input.

Returning to FIG. 2, the error prediction module 221 may predict the one or more errors in the fingerprint data over the period of time. Typically, post the training, the error prediction module 221 may compare real-time fingerprint data of the user 103 with actual/first recorded fingerprint data to predict the one or more errors. In an embodiment, the error prediction module 221 may determine rejection and acceptance by keeping a predefined threshold in consideration. For instance, consider the fingerprint data of a user may be recorded during summer. However, as slowly with change in season, the user may develop an allergy in fingers due to which patterns in the fingerprint of the user may change. Hence, in such case, the error prediction module 221 may compare and indicate error in the fingerprint of the user.

The retraining module 223 may retain the model based on the one or more predicted errors. For example, if the accuracy achieved is 93 percentage, whereas 7% error in indicated. In such case, noticed difference is used to retrain the model. Further, the recently trained model may be replaced with the previous model. Thus, with every percentage of error retraining, a change in skin lining of the finger of the user may be analyzed and used for training the model for accurate biometric authentication. Thus, the recurrent training of the model based on the one or more errors may be utilized to reduce the error in the prediction.

Exemplary Scenarios:

Numerical Representation:

When a user provides a fingerprint scan for a first time to the sensing devices, the fingerprint data may be stored in a temporary memory allocated by the operating system of the authentication system 101. The sensed fingerprint data is further expanded. The sensed data may include a numerical/integer value and pattern which may appear as a matrix. These numerical/integers are expanded based on relativity among the values. For instance, the upper limit and lower limit of the patterns are calculated along with different distortion angles which helps to train multiple distorted values at a single instance. For example, at single point, if the value is 42 and based on its relativity with other values, the limits can be computed using standard deviation as well as variance. The distorted values are also trained along with set of expanded values. Post deriving the expanded values, the authentication system trains the model with the numerical attributes as well as the expanded values. The training may be performed using LSTM network which may improve the performance by learning the historic pattern as well as present pattern. Post training, one or more thresholds may be identified and the weights value of the LSTM neural network model. Further, one or more error between the trained and real time data is being predicted which may be further used in order to adapt the changes over a period of time. In an embodiment, the prediction of the one or more errors may take over a long period of time (for example, in years and months). The one or more predicted errors are utilized for retraining the model.

Image Based Representation:

Consider a user provide a fingerprint scan to the authentication system for a first time. In such of image sensors, image of linings are captured and further used for computation based on the features of the image. In an embodiment, the image is converted or stored in form of pixel. Further, the authentication system 101 uses these images in form of pixel and use CNN (convolutional neural networks) to determine different patterns as well as define different errors which can be learned before prediction. The CNN training includes max pooling, reverse pooling as well as other layers of pixels of the said image for learning the patterns as well as errors. The model is trained and the weight for the model is computed and stored for the use of prediction. Thus, the authentication system 101 uses the trained model to predict the similarity between given pixel value and trained representation of pixels and determine the authenticity based upon the similarity of the pixels.

Figure 4:
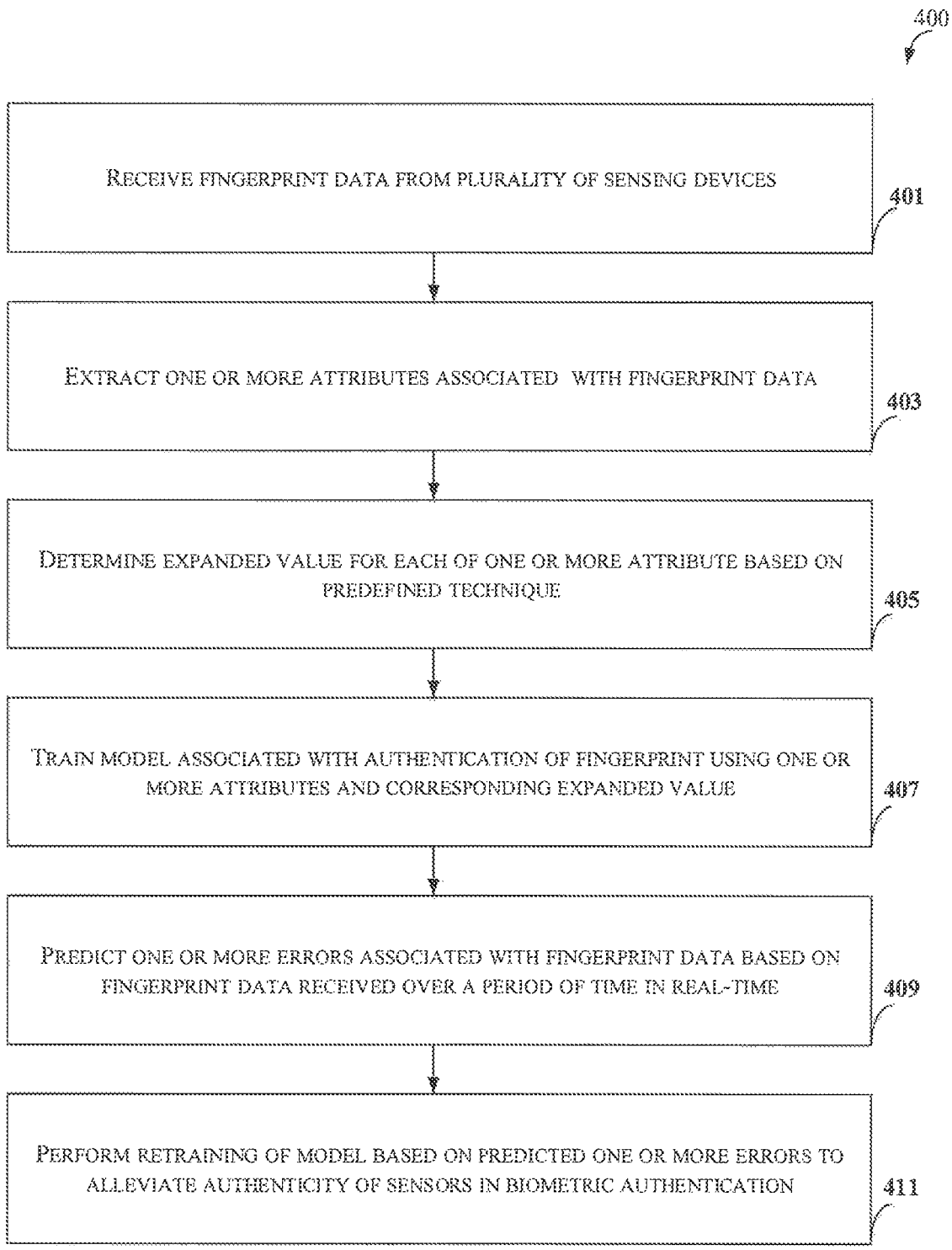
FIG. 4 illustrates a flowchart showing a method for alleviating authenticity of sensors in biometric authentication in accordance with some embodiments of present disclosure.

FIG. 4 illustrates a flowchart showing a method for alleviating authenticity of sensors in biometric authentication in accordance with some embodiments of present disclosure.

As illustrated in FIG. 4, the method 400 includes one or more blocks for alleviating authenticity of sensors in biometric authentication. The method 400 may be described in the general context of computer executable instructions. Generally, computer executable instructions can include routines, programs, objects, components, data structures, procedures, modules, and functions, which perform particular functions or implement particular abstract data types.

The order in which the method 400 is described is not intended to be construed as a limitation, and any number of the described method blocks can be combined in any order to implement the method. Additionally, individual blocks may be deleted from the methods without departing from the scope of the subject matter described herein. Furthermore, the method can be implemented in any suitable hardware, software, firmware, or combination thereof.

At block 401 the fingerprint data is received by the receiving module 21 from the plurality of sensing devices 113 configured in the authentication system 101.

At block 403 the one or more attributes associated with the fingerprint data is extracted by the attribute extracting module 215.

At block 405, the expanded value for each of the one or more attributes is determined by the value determination module 217 based on the one or more predefined techniques.

At block 407, the model is trained by the training module 219. The model is associated with authentication of fingerprints and is trained using the one or more attributes and corresponding expanded value.

At block 409, the one or more errors associated with the fingerprint data is predicted by the error prediction module 221 based on the fingerprint data received over the period of time in real-time.

At block 411, the model is retrained by the retraining module 223 based on the predicted one or more errors to alleviate authenticity of sensors in biometric authentication.

Figure 5:
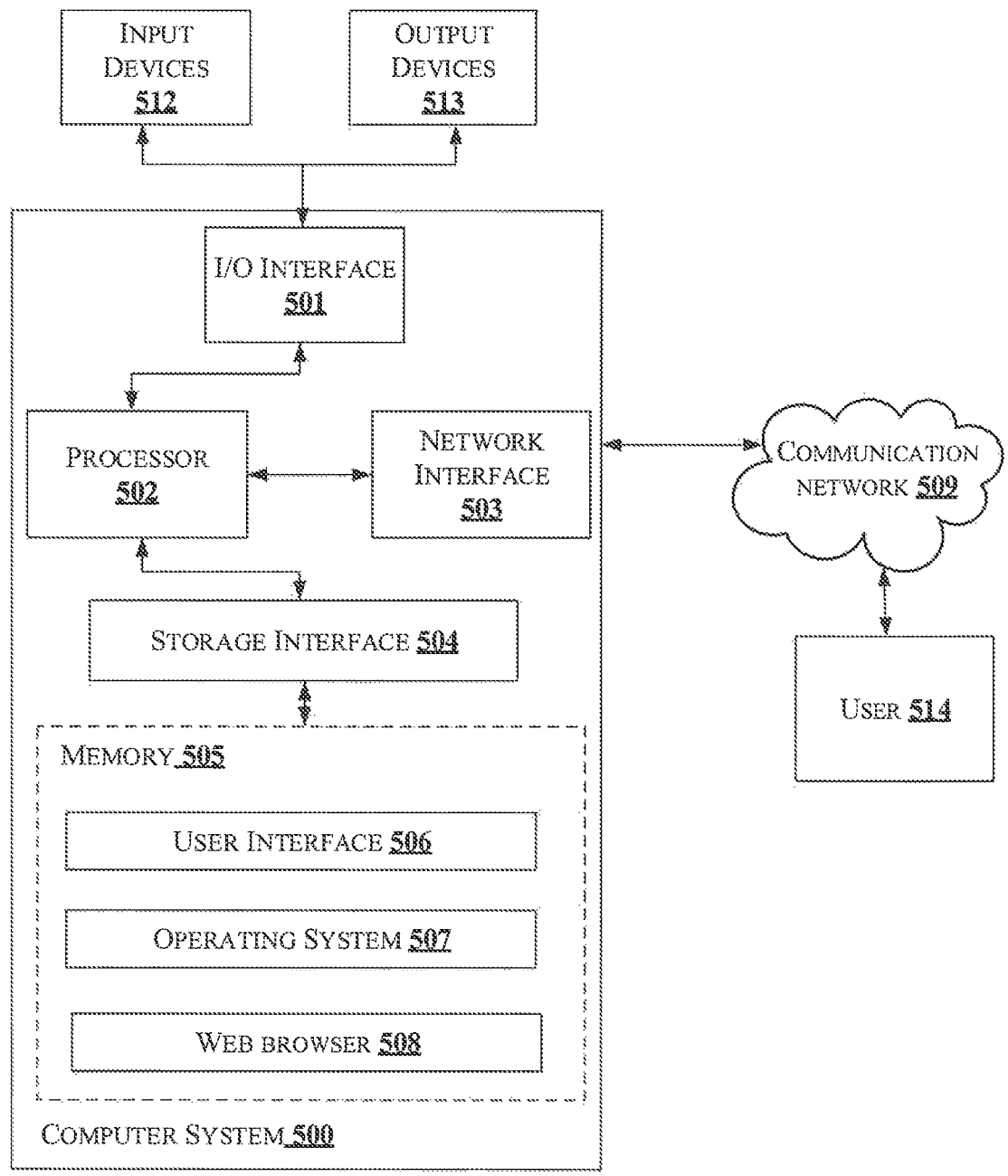
FIG. 5 illustrates a block diagram of an exemplary computer system for implementing embodiments consistent with the present disclosure.

FIG. 5 illustrates a block diagram of an exemplary computer system 500 for implementing embodiments consistent with the present disclosure. In an embodiment, the computer system 500 may be used to implement the authentication system 101. The computer system 500 may include a central processing unit ("CPU" or "processor") 502. The processor 502 may include at least one data processor for alleviating authenticity of sensors in biometric authentication. The processor 502 may include specialized processing units such as, integrated system (bus) controllers, memory management control units, floating point units, graphics processing units, digital signal processing units, etc.

The processor 502 may be disposed in communication with one or more input/output (I/O) devices (not shown) via I/O interface 501. The I/O interface 501 may employ communication protocols/methods such as, without limitation, audio, analog, digital, monoaural, RCA, stereo, IEEE-1394, serial bus, universal serial bus (USB), infrared, PS/2, BNC, coaxial, component, composite, digital visual interface (DVI), high-definition multimedia interface (HDMI), RF antennas, S-Video, VGA, IEEE 802.n/b/g/n/x, Bluetooth, cellular (e.g., code-division multiple access (CDMA), high-speed packet access (HSPA+), global system for mobile communications (GSM), long-term evolution (LTE), WiMax, or the like), etc.

Using the I/O interface 501, the computer system 500 may communicate with one or more VO devices such as input devices 512 and output devices 513. For example, the input devices 512 may be an antenna, keyboard, mouse, joystick, (infrared) remote control, camera, card reader, fax machine, dongle, biometric reader, microphone, touch screen, touchpad, trackball, stylus, scanner, storage device, transceiver, video device/source, etc. The output devices 613 may be a printer, fax machine, video display (e.g., Cathode Ray Tube (CRT), Liquid Crystal Display (LCD), Light-Emitting Diode (LED), plasma, Plasma Display Panel (PDP), Organic Light-Emitting Diode display (OLED) or the like), audio speaker, etc.

In some embodiments, the computer system 500 consists of the authentication system 101. The processor 502 may be disposed in communication with the communication network 509 via a network interface 503. The network interface 503 may communicate with the communication network 509. The network interface 503 may employ connection protocols including, without limitation, direct connect, Ethernet (e.g., twisted pair 10/100/1000 Base T), transmission control protocol/internet protocol (TCP/IP), token ring, IEEE 802.11a/b/g/n/x, etc. The communication network 509 may include, without limitation, a direct interconnection, local area network (LAN), wide area network (WAN), wireless network (e.g., using Wireless Application Protocol), the Internet, etc. Using the network interface 503 and the communication network 509, the computer system 500 may communicate with a user 514. The network interface 503 may employ connection protocols include, but not limited to, direct connect, Ethernet (e.g., twisted pair 10/100/1000 Base T), transmission control protocol/internet protocol (TCP/IP), token ring, IEEE 802.1a/b/g/n/x, etc.

The communication network 509 includes, but is not limited to, a direct interconnection, an e-commerce network, a peer to peer (P2P) network, local area network (LAN), wide area network (WAN), wireless network (e.g., using Wireless Application Protocol), the internet, Wi-Fi and such. The first network and the second network may either be a dedicated network or a shared network, which represents an association of the different types of networks that use a variety of protocols, for example, Hypertext Transfer Protocol (HTTP), Transmission Control Protocol/Internet Protocol (TCP/IP), Wireless Application Protocol (WAP), etc., to communicate with each other. Further, the first network and the second network may include a variety of network devices, including routers, bridges, servers, computing devices, storage devices, etc.

In some embodiments, the processor 502 may be disposed in communication with a memory 505 (e.g., RAM, ROM, etc. not shown in FIG. 5) via a storage interface 504. The storage interface 504 may connect to memory 505 including, without limitation, memory drives, removable disc drives, etc., employing connection protocols such as, serial advanced technology attachment (SATA), Integrated Drive Electronics (IDE), IEEE-1394, Universal Serial Bus (USB), fiber channel, Small Computer Systems Interface (SCSI), etc. The memory drives may further include a drum, magnetic disc drive, magneto-optical drive, optical drive, Redundant Array of Independent Discs (RAID), solid-state memory devices, solid-state drives, etc.

The memory 505 may store a collection of program or database components, including, without limitation, user interface 506, an operating system 507 etc. In some embodiments, computer system 500 may store user/application data, such as, the data, variables, records, etc., as described in this disclosure. Such databases may be implemented as fault-tolerant, relational, scalable, secure databases such as Oracle or Sybase.

The operating system 507 may facilitate resource management and operation of the computer system 500. Examples of operating systems include, without limitation, APPLE MACINTOSH® OS X, UNIX®, UNIX-like system distributions (E.G., BERKELEY SOFTWARE DISTRIBUTION™ (BSD), FREEBSD™, NETBSD™, OPENBSD™, etc.), LINUX DISTRIBUTIONS™ (E.G., RED HAT™, UBUNTU™, KUBUNTU™, etc.), IBM™ OS/2, MICROSOFT™ WINDOWS™ (XP™, VISTA™/7/8, 10 etc.), APPLE® IOS™, GOOGLER ANDROID™, BLACKBERRY® OS, or the like.

In some embodiments, the computer system 500 may implement a web browser 508 stored program component. The web browser 508 may be a hypertext viewing application, for example MICROSOFT® INTERNET EXPLORER™, GOOGLE® CHROME™, MOZILLA® FIREFOX™, APPLE® SAFARI™, etc. Secure web browsing may be provided using Secure Hypertext Transport Protocol (HTTPS), Secure Sockets Layer (SSL), Transport Layer Security (TLS), etc. Web browsers 408 may utilize facilities such as AJAX™, DHTML™, ADOBE® FLASH™, JAVASCRIPT™, JAVA™, Application Programming Interfaces (APIs), etc. In some embodiments, the computer system 500 may implement a mail server stored program component. The mail server may be an Internet mail server such as Microsoft Exchange, or the like. The mail server may utilize facilities such as ASP™, ACTIVEX™, ANSI™ C++/C#, MICROSOFT®, .NET™, CGI SCRIPTS™, JAVA™, JAVASCRIP™, PERL™, PHP™, PYTHON™, WEBOBJECTS™, etc. The mail server may utilize communication protocols such as Internet Message Access Protocol (IMAP), Messaging Application Programming Interface (MAPI), MICROSOFT® exchange, Post Office Protocol (POP), Simple Mail Transfer Protocol (SMTP), or the like. In some embodiments, the computer system 500 may implement a mail client stored program component. The mail client may be a mail viewing application, such as APPLE® MAIL™, MICROSOFT® ENTOURAGE™, MICROSOFT® OUTLOOK™, MOZILLA® THUNDERBIRD™, etc.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include Random Access Memory (RAM), Read-Only Memory (ROM), volatile memory, non-volatile memory, hard drives, CD ROMs, DVDs, flash drives, disks, and any other known physical storage media.

Advantages of the Present Disclosure

An embodiment of the present disclosure provides error measurement and correction which helps to receive high accuracy biometric credentials for authentication.

An embodiment of the present disclosure provides hardware independent and automated learning which helps to increase performance and learning over a time with much faster interpretation.

An embodiment of the present disclosure does not rely heavily on the external factors or environmental factors.

An embodiment of the present disclosure enables smooth orientation detection and prediction which reduces taking multiple shots or un-predictable orientation of the finger print.

An embodiment of the present disclosure solves finger diversification and orientation problem without any additional consumption of extra memory.

An embodiment of the present disclosure uses cognitive intelligence to determine error patterns. Hence, reducing chances of failure.

In an embodiment of the present, mobile devices may be upgraded with A empowered sensing unit without any kind of hardware interface changes. Moreover, for system based fingerprint sensing unit, the dataset is evaluated by the pattern which becomes regular learning.

The present disclosure helps to identify different types of authentication device interface errors which have been received by the authentication system as well as the variance and limitation which can be traced out based on future fix and release.

The present disclosure contains AI enhanced platform which comprises compatibility to adopt with different types of hardware to make any system independent of hardware changes. This makes the present disclosure more robust as well as makes user experience much better than the current state of the art services. Further, the design includes cognitive way of understanding the finger print and expanding these understanding including error to get wider prospects. These errors are observed and processed through retraining for the parametric changes. Also, deviation in the fingerprint which are affected due to temperature and other parameters cannot affect in determining the correct fingerprint. Further, the use of cognitive intelligence provides higher accuracy and it can be used with various fingerprint sensors like optical, captive and ultrasonic sensors etc.

The described operations may be implemented as a method, system or article of manufacture using standard programming and/or engineering techniques to produce software, firmware, hardware, or any combination thereof. The described operations may be implemented as code maintained in a "non-transitory computer readable medium", where a processor may read and execute the code from the computer readable medium. The processor is at least one of a microprocessor and a processor capable of processing and executing the queries. A non-transitory computer readable medium may include media such as magnetic storage medium (e.g., hard disk drives, floppy disks, tape, etc.), optical storage (CD-ROMs, DVDs, optical disks, etc.), volatile and non-volatile memory devices (e.g., EEPROMs, ROMs, PROMs, RAMs, DRAMs, SRAMs, Flash Memory, firmware, programmable logic, etc.), etc. Further, non-transitory computer-readable media include all computer-readable media except for a transitory. The code implementing the described operations may further be implemented in hardware logic (e.g., an integrated circuit chip, Programmable Gate Array (PGA), Application Specific Integrated Circuit (ASIC), etc.).

Still further, the code implementing the described operations may be implemented in "transmission signals", where transmission signals may propagate through space or through a transmission media, such as, an optical fiber, copper wire, etc. The transmission signals in which the code or logic is encoded may further include a wireless signal, satellite transmission, radio waves, infrared signals, Bluetooth, etc. The transmission signals in which the code or logic is encoded is capable of being transmitted by a transmitting station and received by a receiving station, where the code or logic encoded in the transmission signal may be decoded and stored in hardware or a non-transitory computer readable medium at the receiving and transmitting stations or devices. An "article of manufacture" includes non-transitory computer readable medium, hardware logic, and/or transmission signals in which code may be implemented. A device in which the code implementing the described embodiments of operations is encoded may include a computer readable medium or hardware logic. Of course, those skilled in the art will recognize that many modifications may be made to this configuration without departing from the scope of the invention, and that the article of manufacture may include suitable information bearing medium known in the art.

The terms "an embodiment", "embodiment", "embodiments", "the embodiment", "the embodiments", "one or more embodiments", "some embodiments", and "one embodiment" mean "one or more (but not all) embodiments of the invention(s)" unless expressly specified otherwise.

The terms "including", "comprising", "having" and variations thereof mean "including but not limited to", unless expressly specified otherwise.

The enumerated listing of items does not imply that any or all of the items are mutually exclusive, unless expressly specified otherwise.

The terms "a", "an" and "the" mean "one or more", unless expressly specified otherwise.

A description of an embodiment with several components in communication with each other does not imply that all such components are required. On the contrary, a variety of optional components are described to illustrate the wide variety of possible embodiments of the invention.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the invention need not include the device itself.

The illustrated operations of FIG. 5 show certain events occurring in a certain order. In alternative embodiments, certain operations may be performed in a different order, modified or removed. Moreover, steps may be added to the above described logic and still conform to the described embodiments. Further, operations described herein may occur sequentially or certain operations may be processed in parallel. Yet further, operations may be performed by a single processing unit or by distributed processing units.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based here on. Accordingly, the disclosure of the embodiments of the invention is intended to be illustrative, but not limiting, of the scope of the invention, which is set forth in the following claims.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

REFERRAL NUMERALS

| Reference Number | Description |
| --- | --- |
| 101 | Authentication system |
| 103 | User |
| 105 | Database |
| 107 | I/O interface |
| 109 | Memory |
| 111 | Processor |
| 113 | Plurality of sensing devices |
| 200 | Data |
| 201 | Fingerprint data |
| 203 | Attribute data |
| 205 | Expanded data |
| 207 | Model |
| 209 | Other data |
| 211 | Modules |
| 213 | Receiving module |
| 215 | Attribute extracting module |
| 217 | Value determination module |
| 219 | Training module |
| 221 | Error prediction module |
| 223 | Retraining module |
| 225 | Other modules |
| 301 | Convnet layer 1 |
| 303 | Pool layer 1 |
| 305 | Convnet layer 2 |
| 307 | Pool layer 2 |
| 309 | Global pool |
| 311 | Fully connected layer |
| 313 | Output layer |
| 500 | Computer system |
| 501 | I/O interface |
| 502 | Processor |
| 503 | Network interface |
| 504 | Storage interface |
| 505 | Memory |
| 506 | User interface |
| 507 | Operating system |
| 508 | Web browser |
| 509 | Communication network |
| 512 | Input devices |
| 513 | Output devices |
| 514 | User |

What is claimed is:

1. An authentication system for alleviating authenticity of sensors in biometric authentication, comprising:
    a processor; and
    a memory communicatively coupled to the processor, wherein the memory stores processor instructions, which, on execution, causes the processor to:
        receive fingerprint data from a plurality of sensing devices configured in the authentication system;
        extract one or more attributes associated with the fingerprint data;
        determine an expanded value for each of the one or more attributes based on one or more predefined techniques;
        train a model associated with authentication of fingerprints using the one or more attributes and corresponding expanded value;
        predict one or more errors associated with the fingerprint data based on fingerprint data received over a period of time in real-time; and
        perform retraining of the model based on the predicted one or more errors to alleviate authenticity of sensors in biometric authentication.

2. The authentication system as claimed in claim 1, wherein the one or more attributes comprises pixel values, patterns values, pre-defined template values, numerical and integers.

3. The authentication system as claimed in claim 1, wherein the one or more attributes corresponds to a type of the plurality of sensing devices and one or more external environment parameters.

4. The authentication system as claimed in claim 1, wherein the processor determines the expanded value by identifying an upper limit and a lower limit for the one or more attributes along with a plurality of distortion angles.

5. The authentication system as claimed in claim 1, wherein the processor authenticates fingerprints of a user in real-time.

6. The authentication system as claimed in claim 1, wherein the processor predicts the one or more errors by:
    determining at least one error in the fingerprint data over the period of time based on actual stored fingerprint data associated with the user; and
    performing one or more modification in the model associated with authentication of fingerprints based on the at least one error in the fingerprint data.

7. A non-transitory computer readable medium including instruction stored thereon that when processed by at least one processor cause an authentication system to perform operation comprising:
    receiving fingerprint data from a plurality of sensing devices configured in the authentication system;
    extracting one or more attributes associated with the fingerprint data;
    determining an expanded value for each of the one or more attributes based on one or more predefined techniques;
    training a model associated with authentication of fingerprints using the one or more attributes and corresponding expanded value;
    predicting one or more errors associated with the fingerprint data based on fingerprint data received over a period of time in real-time; and
    performing retraining of the model based on the predicted one or more errors to alleviate authenticity of sensors in biometric authentication.

8. The medium as claimed in claim 7, wherein the one or more attributes comprises pixel values, patterns values, pre-defined template values, numerical and integers.

9. The medium as claimed in claim 7, wherein the one or more attributes corresponds to a type of the plurality of sensing devices and one or more external environment parameters.

10. The medium as claimed in claim 7, wherein the instructions causes the processor to determine the expanded value comprises identifying an upper limit and a lower limit for the one or more attributes along with a plurality of distortion angles.

11. The medium as claimed in claim 7, wherein the instructions causes the processor to authenticate fingerprints of a user in real-time.

12. The medium as claimed in claim 7, wherein the instructions causes the processor to predict the one or more errors by:
- determine at least one error in the fingerprint data over the period of time based on actual stored fingerprint data associated with the user, and
- one or more modification in the model associated with authentication of fingerprints based on the at least one error in the fingerprint data.

13. A method of alleviating authenticity of sensors in biometric authentication, the method comprising:
- receiving, by an authentication system, fingerprint data from a plurality of sensing devices configured in the authentication system;
- extracting, by the authentication system, one or more attributes associated with the fingerprint data;
- determining, by the authentication system, an expanded value for each of the one or more attributes based on one or more predefined techniques;
- training, by the authentication system, a model associated with authentication of fingerprints using the one or more attributes and corresponding expanded value;
- predicting, by the authentication system, one or more errors associated with the fingerprint data based on fingerprint data received over a period of time in real-time; and
- performing, by the authentication system, retraining of the model based on the predicted one or more errors to alleviate authenticity of sensors in biometric authentication.

14. The method as claimed in claim 13, wherein the one or more attributes comprises pixel values, patterns values, pre-defined template values, numerical and integers.

15. The method as claimed in claim 13, wherein the one or more attributes corresponds to a type of the plurality of sensing devices and one or more external environment parameters.

16. The method as claimed in claim 13, wherein determining the expanded value comprises identifying an upper limit and a lower limit for the one or more attributes along with a plurality of distortion angles.

17. The method as claimed in claim 13 further comprising authenticating fingerprints of a user in real-time.

18. The method as claimed in claim 13, wherein predicting the one or more errors comprises:
- determining, by the authentication system (101), at least one error in the fingerprint data over the period of time based on actual stored fingerprint data associated with the user;
- performing, by the authentication system (101), one or more modification in the model (207) associated with authentication of fingerprints based on the at least one error in the fingerprint data.

* * * * *